US010613900B2

(12) United States Patent
Holt (10) Patent No.: US 10,613,900 B2
(45) Date of Patent: Apr. 7, 2020

(54) MULTI-TENANT MONITORING (71) Applicants: Waratek Limited, Dublin (IE); John Matthew Holt, Dublin (IE)

(72) Inventor: John Matthew Holt, Dublin (IE)

(73) Assignee: Waratek Limited (IE)

(*) Notice: Subject to any disclaimer, the term of this patent is extended or adjusted under 35 U.S.C. 154(b) by 367 days.

(21) Appl. No.: 15/027,093

(22) PCT Filed: Oct. 2, 2014

(86) PCT No.: PCT/AU2014/050265
§ 371 (c)(1),
(2) Date: Apr. 4, 2016

(87) PCT Pub. No.: WO2015/048855
PCT Pub. Date: Apr. 9, 2015

(65) Prior Publication Data
US 2016/0239343 A1 Aug. 18, 2016

(30) Foreign Application Priority Data

Oct. 5, 2013 (AU) .................. 2013903845

(51) Int. Cl.
G06F 9/50 (2006.01)
G06F 9/48 (2006.01)
(Continued)

(52) U.S. Cl.
CPC ........ G06F 9/5011 (2013.01); G06F 9/45533 (2013.01); G06F 9/45558 (2013.01);
(Continued)

(58) Field of Classification Search
None
See application file for complete search history.

(56) References Cited

U.S. PATENT DOCUMENTS 6,513,158 B1   1/2003 Yogaratnam
6,931,544 B1   8/2005 Kienhofer et al.
(Continued)

FOREIGN PATENT DOCUMENTS

WO      2013163679 A1   11/2013

OTHER PUBLICATIONS

Australian Patent Office, International Search Report and the Written Opinion of the International Searching Authority, dated Dec. 22, 2014, for PCT/AU2014/050265.

Primary Examiner — Sisley N Kim
(74) Attorney, Agent, or Firm — Design IP (57) ABSTRACT The present invention discloses an alternative arrangement to wake-on-LAN and which is designed specifically for multi-tenant cloud computing and virtualized server environments. This new arrangement identifies which tenants or applications of a multi-tenant server are idle, and when a tenant or application is identified as idle, it transparently reduces the reserved computational capacity footprint of the application or tenant without shutting down the tenancy or exiting the application. Furthermore, the near-instantaneous resumption of the idle tenant or application is achieved when some external event is detected which relates to the passivated tenant or application.

22 Claims, 9 Drawing Sheets (51) Int. Cl.
*G06F 9/455* (2018.01)
*G06F 12/02* (2006.01)

(52) U.S. Cl.
CPC ............ *G06F 9/485* (2013.01); *G06F 9/5022* (2013.01); *G06F 12/0253* (2013.01); *G06F 2009/4557* (2013.01); *G06F 2009/45575* (2013.01); *G06F 2009/45583* (2013.01); *G06F 2212/702* (2013.01)

(56) References Cited

U.S. PATENT DOCUMENTS

| | | | |
|---|---|---|---|
| 2005/0065992 A1* | 3/2005 | Creamer | G06F 9/505 709/200 |
| 2008/0163169 A1 | 7/2008 | Alcott et al. | |
| 2010/0325077 A1* | 12/2010 | Higuchi | G06F 9/468 706/47 |
| 2011/0107050 A1* | 5/2011 | Vengerov | G06F 12/0269 711/170 |
| 2012/0137101 A1* | 5/2012 | Arcese | G06F 9/5016 711/170 |

* cited by examiner

FIG 1

PRIOR ART

FIG 2

PRIOR ART

MULTI-TENANT MONITORING

FIELD OF THE INVENTION

The present invention relates to multi-tenanted computing such as occurs in a cloud computing environment and/or in virtualisation environments.

Various frameworks are known in which multi-tenanted computing can arise and these include hypervisor, virtual machine monitor, operating system containers, and multiple independent processes (or operating system tasks) on a shared operating system.

The present invention is particularly concerned with reducing the consumption of the host's or "landlord's" computer assets by the multiple tenants. Such computer assets include memory, CPU user time, power consumption, and input/output (I/O) bandwidth.

BACKGROUND OF THE INVENTION

Wake-on-LAN (WOL) is an Ethernet computer networking standard that allows a computer to be turned on or awakened by a network message.

The message is usually sent by a program executed on another computer on the same local area network. It is also possible to initiate the message from another network by using subnet directed broadcasts or a WOL gateway service. Equivalent terms include wake on WAN, remote wake-up, power on by LAN, power up by LAN, resume by LAN, resume on LAN and wake up on LAN. In case the computer being awakened is communicating via Wi-Fi, a supplementary standard called Wake on Wireless LAN (WoWLAN) also exists.

The WOL and WoWLAN standards are often supplemented by vendors to provide protocol-transparent on-demand services, for example in the Apple Bonjour wake-on-demand (Sleep Proxy) feature.

Ethernet connections, including home and work networks, wireless data networks and the internet itself, are based on packets of data sent between computers. Wake-on-LAN ("WOL") is implemented using a specially designed packet called a "magic packet", which is sent to the computer to be woken up. The magic packet contains the MAC address of the destination computer which is an identifying number built into each network interface card ("MC") or other Ethernet device in a computer. The MAC address enables each computer to be uniquely recognized and addressed on a network. Powered-down or turned off computers capable of Wake-on-LAN will contain network devices able to "listen" to incoming packets in a low-power mode while the system is powered down. If a magic packet is received that is directed to the device's MAC address, the NIC signals the computer's power supply or motherboard to initiate system wake-up, in much the same way as operating the power on switch would do.

The magic packet is sent on the data link layer (layer 2 in the OSI model) and when sent, is broadcast to all attached devices on a given network, using the network. The IP-address (layer 3 in the OSI model) is not used for this activity.

It is a common misconception that because Wake-on-LAN is built upon broadcast technology it can only be used within the current network subnet. While this is generally the case, there are some exceptions, and Wake-on-LAN can operate across any network in practice, given appropriate configuration and hardware, including remote wake-up across the internet.

In order for Wake-on-LAN to work, parts of the network interface need to stay on. This consumes a small amount of standby power, which is much less than normal operating power. Disabling wake-on-LAN when not needed, can therefore very slightly reduce power consumption on computers that are switched off but remain plugged into an energised power socket.

Typically WOL is used in server environments by configuring the host operating system of the server to shut down or power down the computer after periods of idleness, and rely thereafter on WOL to wake up that server.

While wake-on-LAN has found success in server environments in that kind of role, with the advent of virtualization and cloud computing trends of the last 10 years, the wake-on-LAN technology has ceased to be relevant.

Specifically in multi-tenant cloud computing, where multiple independent and isolated applications are co-located on a single operating system, wake-on-LAN cannot be used to passivate a single tenant when that tenant becomes idle. This is because there are normally one or more other tenants sharing the same computer system which may not be idle. As a result, WOL has ceased to be used in such environments.

Separately, in the era of multi-tenant cloud computing, such as PaaS, SaaS, and devops/dev-test environments, it is very common for half, or more, of all tenants (applications) within a multi-tenant server to be idle at any given moment. In conventional multi-tenant computing environments, idle tenants or applications are not treated in any different manner to busy or active tenants or applications, so that the idle applications or tenants continue to occupy the same physical memory reservation and CPU reservation that the application or tenant would/does occupy when it is active or busy.

Idle tenants or applications in these multi-tenant cloud computing environments thus represent wasted computational capacity (such as wasted CPU reservations, wasted memory capacity, wasted I/O bandwidth, etc), because any computational capacity reserved for idle tenants/applications is by definition not available for use by other active tenants/applications.

The Genesis of the present invention is a desire to provide an efficient scheme to redirect some or all of the reserved computational capacity of the idle tenants or applications to additional active/busy applications or tenants without shutting down or effecting the service level agreement (SLA) of the now-idle tenants/applications. This idle computational capacity could therefore potentially be more profitably redirected to other active or busy tenants or applications, thereby reducing the overall quantity of computing capacity required by shared computer system(s) to operate plural tenants.

SUMMARY OF THE INVENTION

In accordance with a first aspect of the present invention there is disclosed a method of saving computer resources in a multi-tenanted computer environment in which a plurality of tenants operate within a single JAVA virtual machine, or equivalent, said method comprising the steps of:

(i) monitoring predetermined characteristics of the operation of each tenant;

(ii) upon said predetermined characteristics achieving a first predetermined state, or crossing a first predetermined threshold, inactivating the corresponding tenant; and (iii) upon said predetermined characteristics of an inactivated tenant achieving a second predetermined state, or crossing a second predetermined threshold, re-activating the tenant.

In accordance with a second aspect of the present invention there is disclosed a system for saving computer resources in a multi-tenanted computer environment in which a plurality of tenants operate within a single JAVA virtual machine, or equivalent, said system comprising:

a characteristic monitor to monitor predetermined characteristics of the operation of each tenant;

an inactivating actuator connected to said characteristic monitor and operable to inactivate a tenant upon said monitored predetermined characteristics achieving a first predetermined state, or crossing a first predetermined threshold; and a reawakening actuator connected to said characteristic monitor and operable to reactivate said inactivated tenant upon said monitored predetermined characteristics achieving a second predetermined state, or crossing a second predetermined threshold.

BRIEF DESCRIPTION OF THE DRAWINGS

A preferred embodiment of the invention will now be described, by way of example only, with reference to the accompanying drawings in which.

DETAILED DESCRIPTION

The preferred embodiment of the present invention discloses an alternative arrangement to wake-on-LAN which is designed specifically for multi-tenant cloud computing and virtualized server environments. This new arrangement identifies which tenants or applications of a multi-tenant server are idle, and when a tenant or application is identified as idle, it transparently reduces the reserved computational capacity footprint of the application or tenant without shutting down the tenancy or exiting the application. Furthermore, the near-instantaneous resumption of the idle tenant or application is achieved when some external event is detected which relates to the passivated tenant or application.

Figure 1:
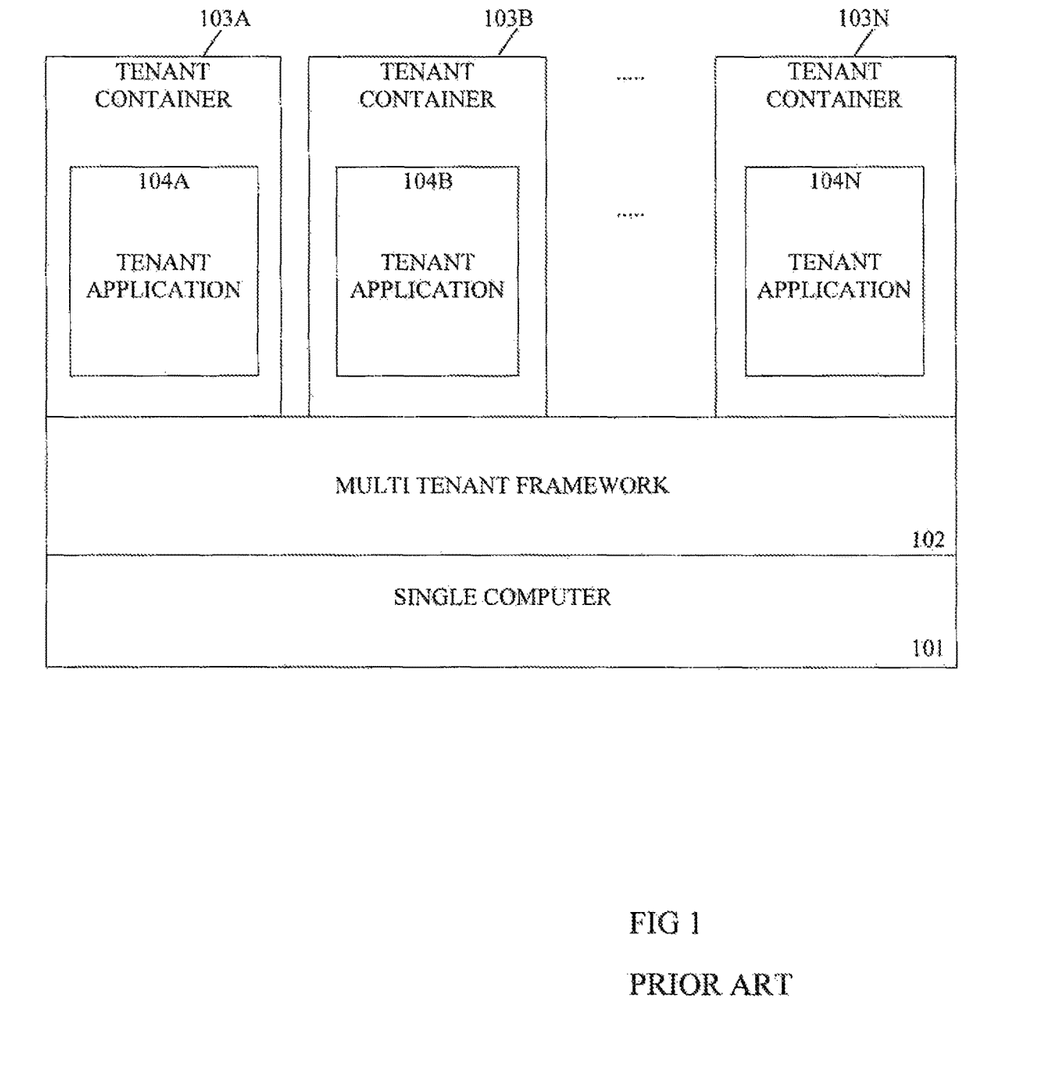
FIG. 1 is a schematic representation of a prior art multi-tenant computer system.

A prior art multi-tenant computer system comprising a single server computer is shown in FIG. 1. This multi-tenant computer system is operated with one of several multi-tenant frameworks 102 such as but not limited to a hypervisor, virtual machine monitor, operating system containers, or multiple independent processes (or multiple independent tasks) on a shared operating system. Regardless of the type of multi-tenant framework used, a plurality of tenant containers 103A, 103B . . . 103N are operated by the multitenant framework 102, and each tenant container 103 operates an isolated application 104A, 104B . . . 104N which can be independent started, stopped, shutdown, and destroyed. Each tenant container 103 and corresponding application 104 can belong to a corresponding unique owner, or all the tenants or applications can be owned by a single entity, or some combination thereof. However, regardless of the ownership arrangements, the multi-tenant framework 102 operates each tenant container 103 and corresponding application 104 in an isolated and independent fashion.

Figure 2:
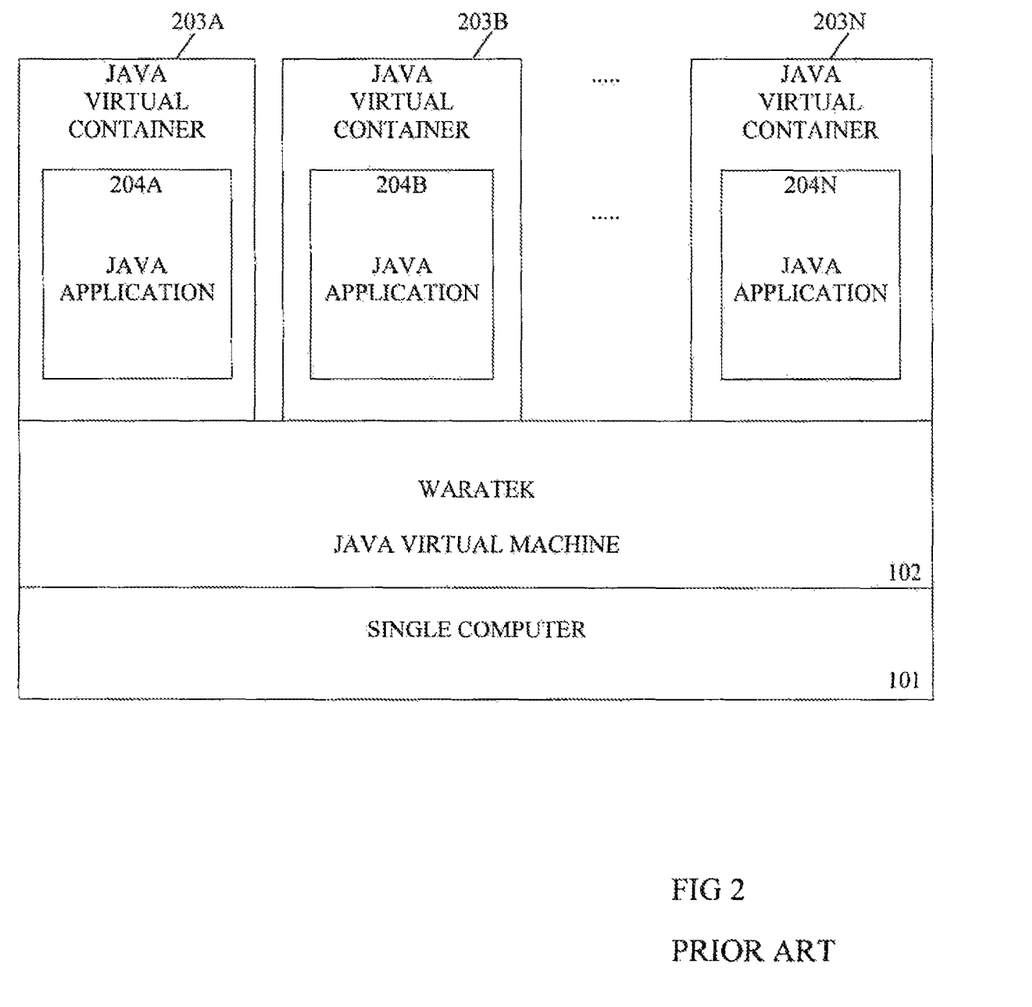
FIG. 2 is a schematic representation of a prior art JAVA Virtual Machine utilising the WARATEK (Registered Trade Mark) JAVA Virtual Machine.

In a second prior art arrangement, the multi-tenant framework is a multi-tenant Java Virtual Machine such as the WARATEK JAVA Virtual Machine as shown in FIG. 2. In this multi-tenant framework, multiple independent tenant applications 204A, 205B . . . 204N are each operated in isolated Java Virtual Containers (JVCs) 203A, 203B . . . 203N, which can be independently started, stopped, shutdown, and destroyed. Other multi-tenant JVMs (such as for example the IBM J9 JVM, and the Sun Microsystems MVM JVM) will be known to those skilled in the computing arts, and the present invention can be applied to all such multi-tenant JVMs mutatis mutandis.

Figure 3:
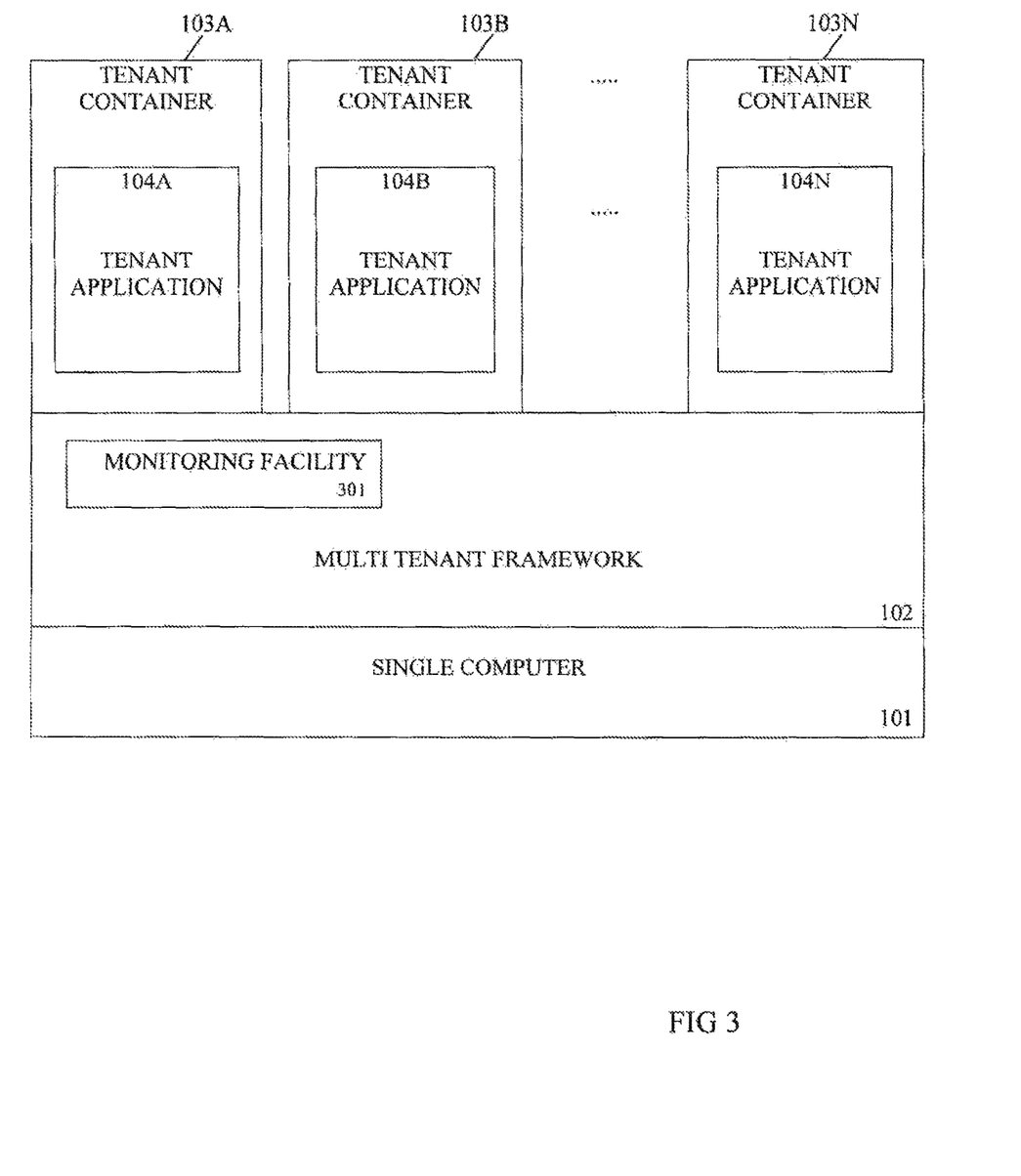
FIG. 3 is a schematic representation illustrating how a multi-tenant framework of FIG. 1, or a multi-tenant JVM of FIG. 2, is modified in accordance with a preferred embodiment of the present invention.

As seen in FIG. 3, in accordance with a first embodiment of the present invention a monitoring facility 301 is provided in the multi-tenant framework software 102 which observes one or more "application activity indicators" for each tenant container 103 and its corresponding tenant application 104. One example of an "application activity indicator" can be reading from, or writing to, transport control protocol (TCP) or user datagram protocol (UDP) sockets undertaken by the tenant container 103 or its corresponding application 104. Other "application activity indicators" for which similar observations of a tenant-container's and/or tenant-application's activity can be made include reading from, or writing to, files on a file system. Additional "application activity indicators" include CPU activity such as by observing or monitoring "user time" of one or more of the threads of a tenant-container and/or tenant application operating within a Linux operating system (or other equivalent means on other operating systems).

It is not necessary for the monitoring facility 301 to be provided as part of the multi-tenant framework 102. In other arrangements, the monitoring facility 301 can be provided in the management software which manages the multi-tenant server 101 or the multi-tenant framework software 102. In yet other arrangements, the monitoring facility 301 can be operated as a separate tenant container 103 of the multi-tenant framework software 102, such as when the monitoring facility 301 is operated as an independent operating system task (process) on top of a shared operating system. It is not necessary for monitoring facility 301 to be substantially operated on the same server computer 101 as multi-tenant framework 102, but that is desirable for performance or efficiency reasons.

Figure 4:
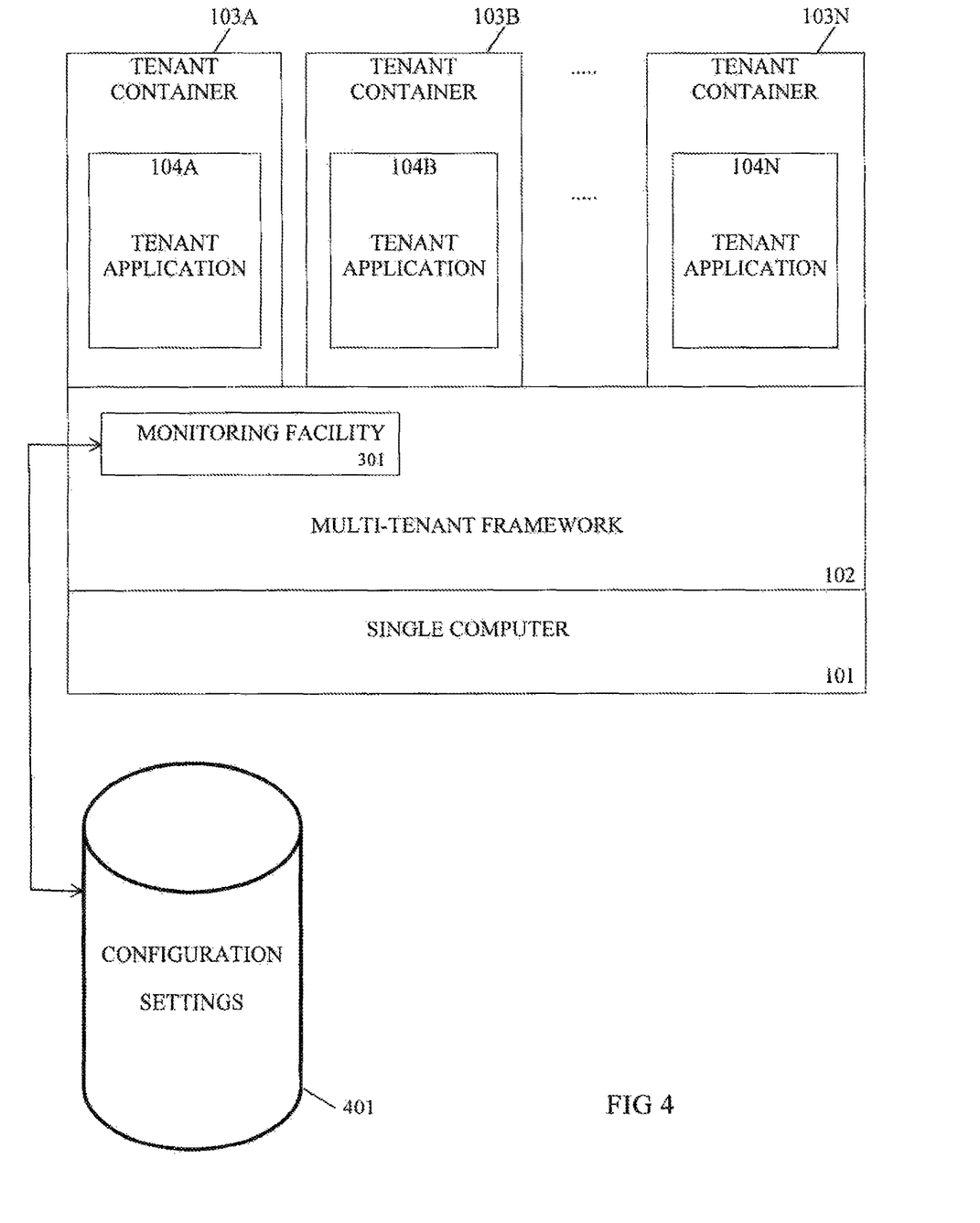
FIG. 4 is a schematic representation illustrating a further modification to the arrangement of FIG. 3.

FIG. 4 shows how in a second embodiment, configuration settings or properties 401 for the monitor facility 301 can be specified by an administrator of the multi-tenant computer system 101, or alternatively by the administrator of one or more of the tenant containers 103 or tenant applications 104, by means of configuration file(s) or configuration setting(s) stored on hard disks, databases, or other storage means. These configuration details or properties 401 optionally specify thresholds of inactivity/idleness (such as elapsed periods of time without at least a certain amount of activity) which the monitoring facility 301 has to wait for, or detect, before passivating the tenant 103 and its corresponding application 104. In different embodiments, the configuration details 401 that specify the duration of the idleness period to wait for can be variable (such as, for example, 5 minutes, or 5 seconds, or any other time interval), and be in addition to the type of tenant or application activity which is to be monitored (eg, TCP reading/writing, and/or UDP reading/writing, and/or file reading/writing, and/or increasing CPU user time, or any combination thereof). A range of potentially desirable configuration properties in accordance with the description herein will be apparent to those skilled in the computing arts beyond those described here.

Figure 5:
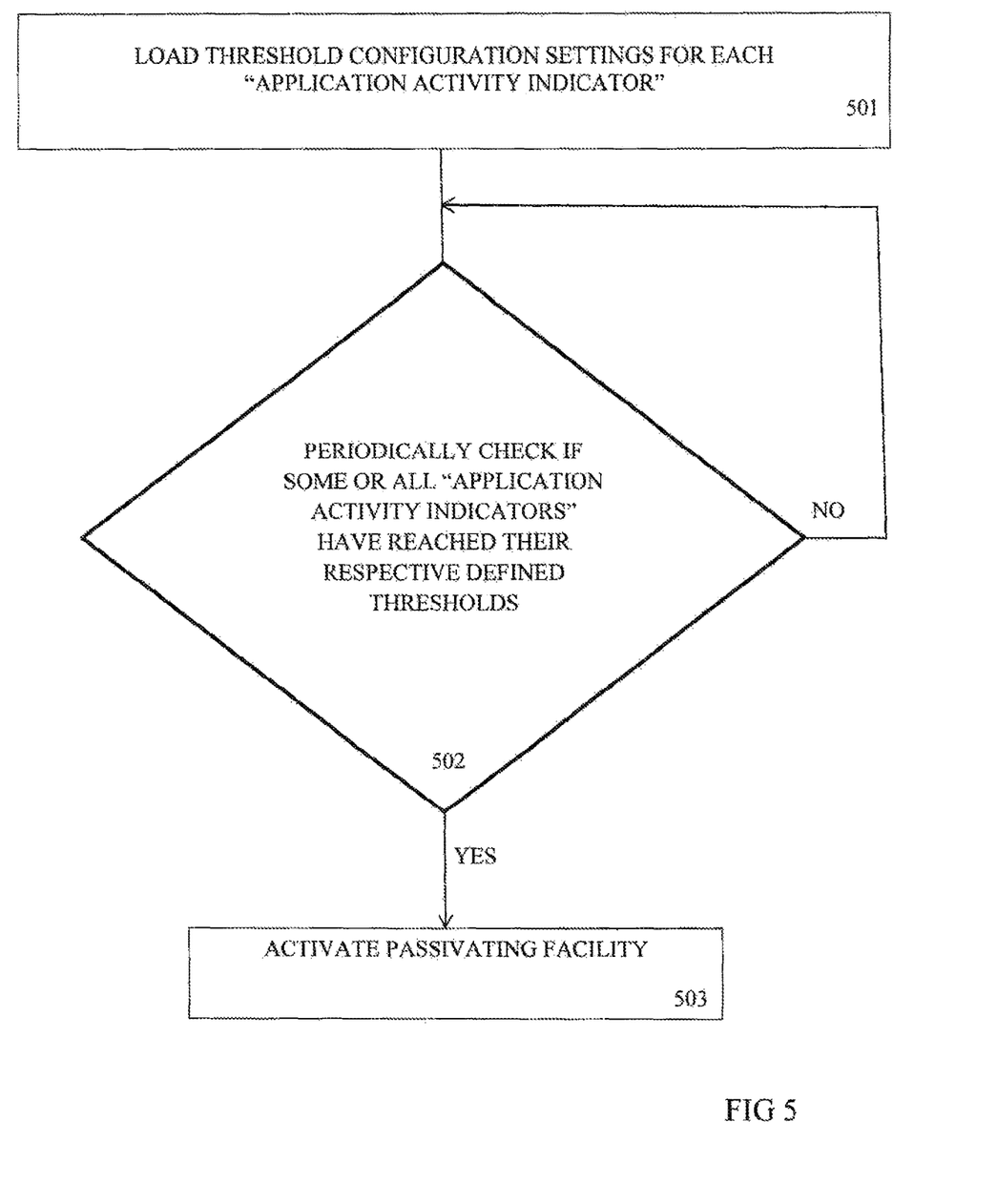
FIG. 5 is a flowchart illustrating the preferred monitoring facility steps.

FIG. 5 shows the monitoring steps of one embodiment of a monitoring facility 301 for monitoring a single tenant-container 103 and its corresponding tenant-application 104. For multiple tenant-containers and/or multiple tenant-applications, the steps of FIG. 5 are repeated for each tenant-container and/or tenant-application which is to be operated in accordance with this invention.

In FIG. 5, optional step 501 shows the loading of the threshold configuration details 401 for a given tenant container 103 and corresponding application 104 by the monitoring facility 301. In some embodiments, this step 501 may be omitted such as when the monitoring facility 301 has fixed or predefined threshold configuration settings.

Step 502 shows that for each "application activity" for which there is an "application activity indicator" configuration, a periodic check is made whether the relative or absolute quantity of some of, or all of, the "application activity indicators" have reached their respectively defined thresholds of idleness. If so, then the actions of the passivating facility are activated at Step 503. Otherwise, the periodic check is repeated one or more times in the future at step 502 again, until Step 503 is caused to be executed, or the tenant container and/or the corresponding application is terminated or shut down.

Figure 6:
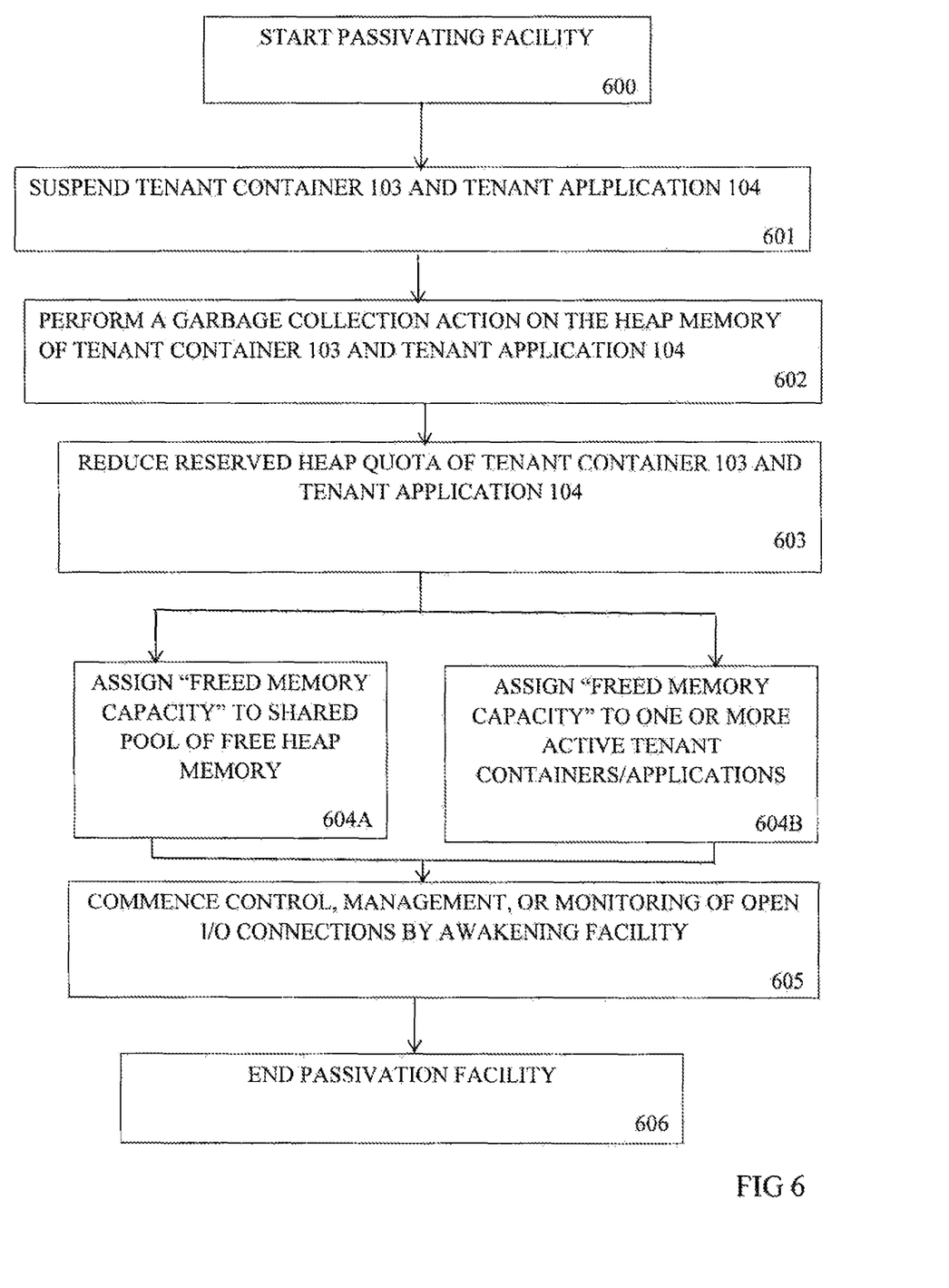
FIG. 6 is a flowchart illustrating the preferred passivating steps.

FIG. 6 shows the passivating steps of a passivating facility indicated in step 503 of FIG. 5. In FIG. 6, a passivating facility is activated by the monitoring facility 301 upon a condition of idleness/inactivity being reached for a given tenant 103 and corresponding application 104 (as shown in FIG. 5). The job of the passivating facility is to "passivate" the effected tenant 103 and corresponding application 104 in order to reduce its computational capacity and/or reservation (such as reducing its CPU reservation, and/or its memory reservation, and/or its IO reservation, etc) so that some or all of the computational capacity previously reserved for the "passivated" tenant container 103 and corresponding application 104 can be made available for other non-passivated tenant containers and their applications.

In FIG. 6 the steps of one such passivating facility are shown. Step 600 commences the passivating activity. In Step 601 the thread(s), process(es), or task(s) of the tenant container 103 and corresponding application 104 that is to be passivated are suspended by the multi-tenant framework 102 (such as by an operating system kernel). An example of suspending a process or suspending a thread in the Linux operating system is the "kill -SIGSTOP <PID>" command. Such a command in the Linux operating system may be desirable to use in embodiments of this invention for Step 601, when the Linux operating system is used as part of the multi-tenant framework 102.

In Step 602, an optional garbage collection action on the heap memory of the tenant container 103 and corresponding application 104 is performed in order to free memory capacity consumed by unreachable (dead) objects in the tenant container 103 and application 104. In other arrangements of steps 602, 603, 604A and 604B, some or all of the memory of the container 103 and application 104 to be passivated may be swapped out of RAM to disk.

In Step 603, the reserved heap quota of the container 103 and application 104 to be passivated (such as for example as was specified by the "-Xmx" command line parameter used to start a Java application 204), is reduced to be approximately the size of the post-garbage collection memory footprint such as after a garbage collection action has been performed in accordance with step 602.

In Steps 604A and 604B, the memory capacity difference between the reserved heap quota and the post-garbage collection memory footprint (i.e. the "freed memory capacity") is made available to other non-passivated tenant-containers and their corresponding applications in optionally one of two arrangements.

In step 604A, some or all of the "freed memory capacity" is added to a shared pool of available memory capacity for use by some or all of the non-passivated tenant-containers and their applications on a non-dedicated basis. Alternatively in step 604B, some or all of the "freed memory capacity" is added to the dedicated reserved heap quota for one or more non-passivated tenant-containers.

Finally in step 605, control or management or monitoring of some or all of the open file descriptors, open sockets, open server sockets, and the like of the tenant container and corresponding application being passivated, is commenced by an awakening facility. This is done without closing any of these files/descriptors/sockets/server sockets.

Many different arrangements of a passivating facility will be apparent to those skilled in the computing arts that will be usable with this invention. Different arrangement of passivating facilities may change the order of steps described above and in FIG. 6, as well as perform additional steps for new or different computational resource types not described herein (such as I/O or bandwidth capacity reservations). All such alternative arrangements are to be understood to be included within the scope of the present invention.

Figure 7:
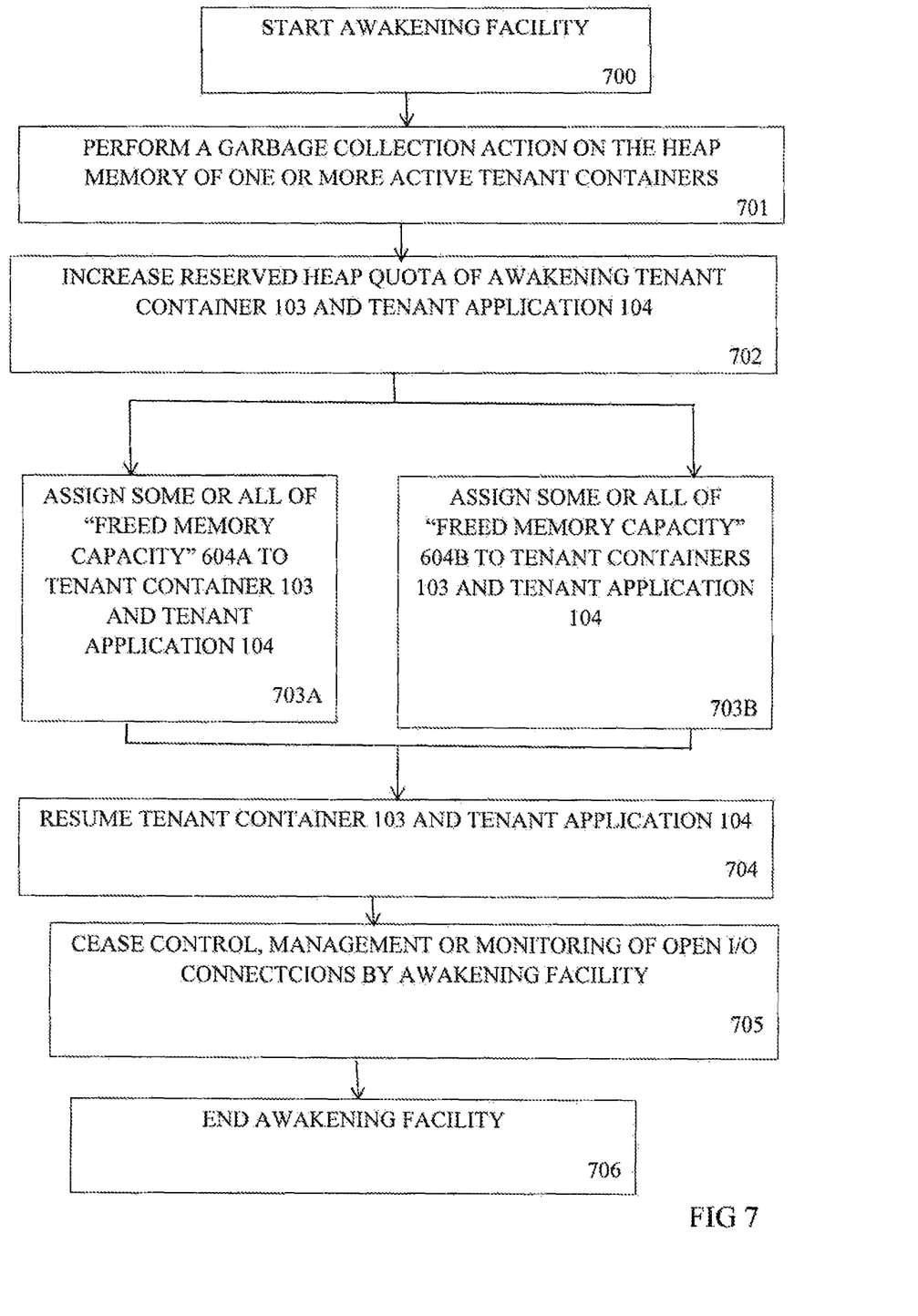
FIG. 7 is a flowchart illustrating the preferred awakening steps.

In FIG. 7 an embodiment of the awakening steps of an awakening facility is shown which either periodically, or interactively through some event notification or callback means, observes some or all of the open files/descriptors/sockets/server sockets/etc for signs of activity, while attempting to keep these files/descriptors/sockets/server sockets open and available. Upon identifying a sign of activity of or on any of the open files/descriptors/sockets/server sockets which are being monitored or managed or controlled, the awakening facility then undertakes to activate the tenant 103 and application 104 to which the files/descriptors/sockets/server sockets belong by carrying out one, some, or all of the steps of FIG. 7.

Step 700 commences the passivating activity. In Step 701, a garbage collection action on the heap memory of one or more of the other (non-passivated) tenant containers and their corresponding applications is optionally performed.

In Steps 702, 703A, and 703B, the reserved heap quota of the awakening tenant container 103 and corresponding application 104 is increased by partially or wholly reversing the effects of steps 603, 604A and 604B undertaken for this tenant previously. Various arrangements of Step 702, 703A and 703B can be used with the ultimate effect of increasing the memory capacity or memory reservation for the awakening tenant-container. FIG. 7 shows two such arrangements as Steps 703A and 703B. In other arrangements of Steps 701, 702, 703A, and 703B where the memory of the application to be awakened was earlier swapped out of RAM to disk, the swapped out memory is partially or wholly swapped back in to RAM again. Thus Steps 701, 702, 703A, and 703B are the functional reverse of the actions undertaken in Steps 603, 604A, and 604B.

In Step 704, the thread(s) or process(es) or task(s) of the awakening tenant container 103 and application 104 are resumed on the multi-tenant framework 102. Thus step 704 is the functional reverse of the action(s) undertaken in step 601.

Finally in Step 705, control or management or monitoring of the open file descriptors, open sockets, open server sockets, and the like are ceased by the awakening facility, and control and management of all such files/descriptors/sockets/etc are resumed by the tenant container 103 and application 104 so that the tenant application can read and write from them thereafter in the same manner as prior to the undertaking of the passivation steps of FIG. 6.

In further embodiments, and in a similar manner to the monitoring facility 301 of FIG. 3, the awakening facility can optionally be configured with arbitrary or user-supplied configurations, settings, details or properties which specify one, some, or all, of the following:
1) the exact or approximate combination of files/descriptors/sockets/server sockets to be monitored by the awakening facility
2) the exact or approximate actions which constitute activity for the awakening facility to respond to
3) the exact or approximate combination of files/descriptors/sockets/server sockets to not be monitored by the awakening facility
4) the exact or approximate actions which do not constitute activity for the awakening facility to respond to.

In yet another embodiment of this invention, the actions which constitute activity for the awakening facility to respond to include one, some or all of:
1) receiving transmitted data of a TCP or UDP socket
2) detecting the last-access timestamp of a file on a file system changing
3) receiving an operating system signal.

In another embodiment of this invention, the actions which do not constitute activity for the awakening facility to respond to include one, or all of:
1) TCP and/or UDP keep-alive packets being transmitted or received periodically
2) Internet control message protocol (ICMP) packets been transmitted or received periodically.

JSleep

In the following example embodiment of the present invention, the terms "Java Virtual Container", "JVC", and "Java Container" are synonymous with a single "tenant-container" or a single "tenant-application".

In this example embodiment, the above-mentioned description is applied and implemented to allow the user to configure a JVC on the Waratek JVM to automatically transition from the Running state to the Paused state and vice-versa, provided certain predetermined conditions are satisfied. This is conveniently termed JSleep.

The following are examples of pause or suspend conditions:
A prolonged situation of CPU idle state for the threads of the JVC.
The lack of outgoing/incoming bytes from/to the sockets of the JVC.
Reaching a predefined threshold (e.g. CPU usage, uptime, bytes sent/received, etc).
The following are examples of resume conditions:
If data is received by one of the sockets of the JVC.
If a predefined timeout is reached (e.g. time of the day, interval of time between wake-up calls, etc).
If another JVC transitions to a different state (e.g. wake up JVC 1 if JVC 2 goes asleep, wake up JVC 1 if JVC 2 wakes up, wake up JVC 1 if JVC 2 shuts down, etc).

JSleep Thread

Figure 8:
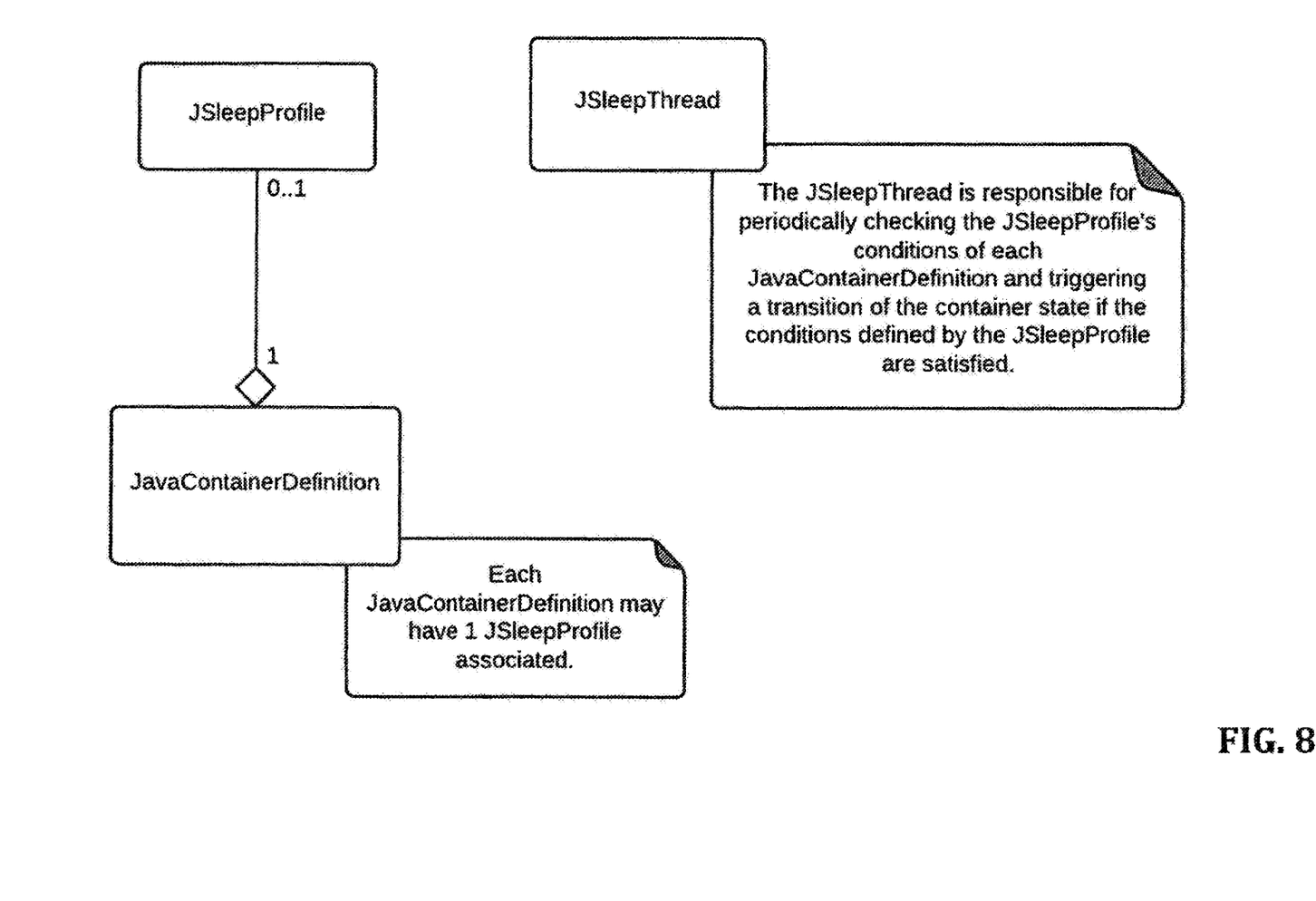
FIG. 8 is a schematic representation of the monitoring arrangement of the preferred embodiment.
Figure 9:
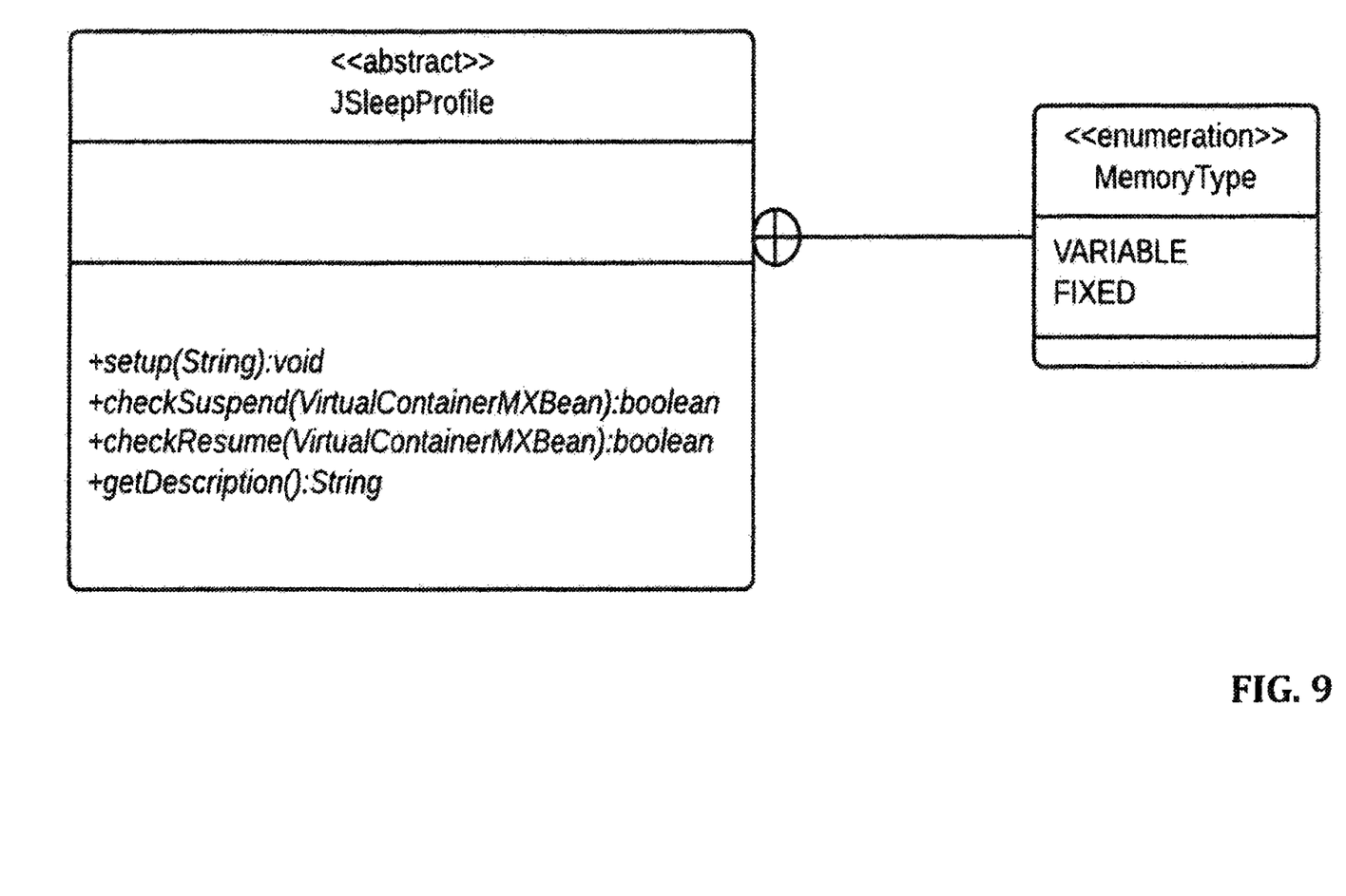
FIG. 9 is a schematic representation of the class diagram of the modified computer operation.

As schematically illustrated in FIGS. 8 and 9, a predetermined single thread, conveniently termed a JSleep thread, is responsible for checking suspend/resume conditions of each JVC at certain time intervals and, if necessary, taking the appropriate actions.

JSleep Actions

Each JVC is configured to have a JSleepProfile. The JSleepProfile is an abstract class. There are specific concrete subclasses of this class that are used to configure the JVC's JSleep behaviour.

This is an extensible framework and allows users to adopt their own concrete implementations of the JSleepProfile class. All that is required is that such classes are in the JVM's classpath.

When a JVC transitions to the Paused state the following steps are taken:
The JVC's dead objects memory is reclaimed by garbage collection (GC).
If the JSleepProfile was configured with Memory Type.VARIABLE, the JVC's unused memory is re-assigned to the VM to be used for other JVCs. If, however, it was configured with MemoryType.FIXED, no actions regarding memory will be taken.
The NC's threads are suspended.
Open file descriptors (FDs) are kept open (sockets, files, etc).

When a JVC transition from the Paused state to the Running state the following steps are taken:
If the JSleepProfile was configured with Memory Type.VARIABLE, the JVM will make its best effort to reassign the entire initial memory to the JVC. If it was configured with MemoryType.FIXED, no actions regarding memory are taken.
All the threads are resumed.

JSleep Setup

JSleep can optionally be configured through the separate cloudvm.management.VirtualContainerMXBean application program interface (API) class of the CloudVM Management API, which is hereby incorporated for all purposes by cross reference.

If any other configuration method is requested (e.g. read from property file, or read from snapshot.xml file in the Waratek JVM), it is reconfigured to also go through this interface. The following code snippet shows how this is achieved:

```
// Get the VirtualMachineMXBean
VirtualMachineMXBean vmbean=
ManagementFactory.getVirtualMachineMXBean( );
// Create VC
JavaContainerMXBean
serverVc=vmbean.getJavaContainer(vmbean.createContainer("Container1", "java DatagramSocketServer", null));
// Setup JSleepProfile
serverVc.set,JSleepProfile("cloudvm.jsleep.profile.NetworkProfile 120000", "FIXED");
```

The code above creates a JVC called Container1 running the DatagramSocketServer application and sets up its JSleep profile to be cloudvm.jsleep.profile.NetworkProfile, with a timeout of 120 seconds. The MemoryType used is FIXED.

The VirtualContainerMXBean.setJSleepProfile method takes two String arguments:
1. The config string, which starts with the fully qualified class name (FQCN) of the concrete JSleepProfile implementation to be used. After the FQCN, there is a space separated list of arguments. The need for arguments, their types and valid values are all defined by the concrete JSleepProfile implementation of choice.
2. The MemoryType string which defines the behaviour of the NC's memory upon JSleep actions. There are two different categories of MemoryType, namely:
    VARIABLE: upon suspension, the free memory of the JVC will be reclaimed by the JVM. Upon resumption, the JVM will use a best effort approach to reassign to the JVC the memory with which it was previously configured
    FIXED: upon suspension no actions are taken regarding the memory of the JVC. Thus upon resumption the JVC is guaranteed to be assigned the memory with which it was previously configured.

User Implemented JSleepProfile

The JSleep framework gives the users the option to implement their own JSleep profiles if they wish.

A custom JSleepProfile is required to extend the abstract class JSleepProfile and provide a concrete implementation for its abstract methods. It also needs to be in the JVM's classpath.

The foregoing describes only some embodiments of the present invention and modifications, obvious to those skilled in the computing arts, can be made thereto without departing from the scope of the present invention.

The term "comprising" (and its grammatical variations) as used herein is used in the inclusive sense of "including" or "having" and not in the exclusive sense of "consisting only of".

The following examples illustrate API classes for an implementation of a JSleep facility for JVCs within the Waratek Java Virtual Machine. Further detail regard the following examples can be found in International Patent Application No. PCT/AU2014/050265, to which the present application claims priority, and the disclosure of which is incorporated by reference in its entirety.

Example 1: Class TimeoutEvent public class TimeoutEvent
extends java.lang.Object
This is a helper class that checks if a certain amount of time has passed since the last time the check was made.
  Constructor Detail
  TimeoutEvent public TimeoutEvent (long timeout)
  Method Detail
  check
  public Boolean check ( )
  This method checks if the timeout this instance was created with has expired since the last time this method was called.
  Returns:
    true if the timeout has expired, false otherwise Example 2: Class BytesReceivedEvent public class BytesReceivedEvent
extends java.lang.Object
This is a helper class that checks if any of the sockets if a JVC have received any data.
  Constructor Detail
  BytesReceivedEvent
  public BytesReceivedEvent ( )
  Method Detail
  check
  public boolean check (VirtualContainerMXBean containerBean)
  This method checks if any data was received by the sockets of the JVC the provided containerBean belong to.
  Parameters:
    containerBean—The VirtualContainerMXBean of the JVC to be checked.
  Returns:
    true if data was received by the sockets of the JVC of the provided containerBean, false otherwise.

Example 3: Class JSleepProfile public abstract class JSleepProfile
extends java.lang.Object
This abstract class defines the common behavior required by JSleep profiles. The concrete subclasses have to implement the checkSuspend and checkResume methods and the getDescription method for this profile.
  See VirtualContainerMXBean.setJSleepProfile (String, String) to know how to setup a JSleepProfile for a VC.
  Nested Classes
  JSleepProfile. MemoryType
  Static class
  This enum defines two different approaches for JVC's configured to have a JSleep profile.
  Constructor Detail
  JSleepProfile
  public JSleepProfile( )
  Method Detail
  setup
  public abstract void setup (java.lang.String config)
  The subclass instance is given the opportunity to do some internal setup with the provided config.
  Parameters:
    config—The String representing the configuration of this profile. The first element of the configuration String is the truly qualified class name of the concrete JSleepProfile implementation, followed by a space separated list of arguments. Such arguments are defined by the concrete implementation of this class.
  checkSuspend
  public abstract Boolean checkSuspend (VirtualContainerMXBean containerBean)
  The concrete implementation of this method decides if the JVC needs to be suspended.
  Parameters:
    containerBean—The VirtualContainerMXBean of this JVC. It can be used to decide if the conditions for suspending the JVC are met.
  Returns:
    true, if the JVC should be suspended, false otherwise.
  checkResume
  public abstract Boolean checkResume (VirtualContainerMXBean containerBean)
  The concrete implementation of this method decides if the JVC needs to be resumed.
  Parameters:
    containerBean—The VirtualContainerMXBean of this JVC. It can be used to decide if the conditions for resuming the JVC are met.

Returns:
    True, if the JVC should be resumed, false otherwise.
getDescription
public abstract java.lang.String getDescription( )
Returns:
    The description of this JSleepProfile.

Example 4: Class NetworkIdleEvent public class NetworkIdleEvent
extends java.lang.Object
This is a helper class that checks if a timeout has expired since the last time data was received from the network by a certain JVC.
Constructor Detail
NetworkIdleEvent
public NetworkIdleEvent (long timeout)
Construct an instance of this class with the provided timeout.
Parameters:
    timeout—The timeout to be checked.
Method Detail
check
public Boolean check (VirtualContainerMXBean containerBean)
This method returns true if the timeout has expired since the last time data was received from the network by the JVC the provided containerBean belongs to.
Parameters:
    containerBean—The VirtualContainerMXBean used to check the received data.
Returns:
    true if the timeout has expired since the last data received by this JVC.

Example 5: Class CpuEvent public class CpuEvenet
extends javalang.Object
This is a helper class that checks if a timeout has expired since the CPU was last busy working for this JVC.
Constructor Detail
CpuEvent: public CpuEvent (long timeout)
Method Detail
check
public boolean check (VirtualContainerMXBean containerBean)
This method returns true if the timeout has expired since the last time the CPU has done any work for the JVC the provided containerBean belong to.
Parameters:
    containerBean—The VirtualContainerMXBean used to check the CPU activity.
Returns:
    true if the timeout has expired since the last time the CPU has done any work for the JVC the provided containerBean belong to.

Example 6: Enum JSIeepProfile.MemoryType public static enum JSleepProfile.MemoryType
extends java&lang.Enum<JSleepProfile. MemoryType>
This enum defines two different approaches for JVC's configured to have a JSleep profile: MemoryType.VARIABLE, and MemoryType.FIXED, both of which are discussed above.

Enum Constant Detail
VARIABLE
Public static final JSleepProfile.MemoryType VARIABLE
The memory of the JVC this profile is used for is variable. The free memory will be released when the JVC goes asleep. When the JVC wakes up, the VM will take a best effort approach to reassign memory to the JVC.
FIXED
Public static final JSleepProfile.MemoryType FIXED
The memory of the JVC this profile is used for is fixed. Both used and free memory is retained when the JVC goes asleep.
Method Detail
values
public static JSleepProfile.MemoryType [ ] values ( )
This method may be used to iterate over the constants as follows:
for (JSleepProfile.MemoryType c: JSleepProfile.MemoryType.valus ( )) System.out.println(c);
Returns:
    an array containing the constants of this enum type, in the order they are declared
valueOf
public static JSleepProfile.MemoryType valueOf (java.lang.String name)
The string must match exactly an identifier used to declare an enum constant in this type. (Extraneous whitespace characters are not permitted.)
Parameters:
    name—the name of the enum constant to be returned.
Returns:
    the enum constant with the specified name.
Throws:
    java.lang.IllegalArgumentException—if this enum type has no constant with the specified name
    java.lang.NullPointerException—if the argument is null
getText
public javalang.String getText( )

Example 7: Class NetworkProfile public class NetworkProfile
extends JSIeepProfile
This profile changes the state of a JVC from Running to Paused and vice versa upon specific network events.
The target JVC's state is changed from Running to Paused if no data is received for a certain amount of time, specified in the configuration string. The JVC's state is changed from Paused to Running if any data is received by the JVC's sockets.
Constructor Detail
Network Profile
public NetworkProfile( )
Method Detail
setup
public void setup(java.lang.String config)
Description copied from class: JSleepProfile
The subclass instance is given the opportunity to do some internal setup with the provided config.
Specified by:
    setup in class JSleepProfile
Parameters:
    config—The String representing the configuration of this profile. The first element of the configuration String is the fully qualified class name of the concrete JSleepProfile implementation, followed by a space separated list of arguments. Such arguments are defined by the concreate implementation of this class.
getDescription
public java.lang.String getDescription ( )
Description copied from class: JSleepProfile
Returns the description of this JSleepProfile.
Specified by:
   getDescription in class JSleepProfile
Returns:
   The description of the JSleepProfile.
checkSuspend
public Boolean checkSuspend (VirtualContainerMXBean containerBean)
Description copied from class: JSleepProfile
The concrete implementation of this method decides if the JVC needs to be suspended.
Specified by:
   checkSuspend in class JSleepProfile
Parameters:
   containerBean—The VirtualContainerMXBean of this JVC. It can be used to decide if the conditions for suspending the JVC are met.
Returns:
   True, if the JVC should be suspended, false otherwise.
checkResume
public Boolean checkSuspend (VirtualContainerMXBean containerBean)
Description copied from class: JSleepProfile
The concrete implementation of this method decides if the JVC needs to be resumed.
Specified by:
   checkResume in class JSleepProfile
Parameters:
   containerBean—The VirtualContainerMXBean of this JVC. It can be used to decide if the conditions for resuming the JVC are met.
Returns:
   True, if the JVC should be resumed, false otherwise.

The invention claimed is:

1. A method of saving computer resources in a multi-tenanted computer environment in which a plurality of tenants operate within a single JAVA virtual machine, or equivalent, said method comprising the steps of:
(i) monitoring predetermined characteristics of the operation of each tenant;
(ii) upon said predetermined characteristics achieving a first predetermined state, or crossing a first predetermined threshold, inactivating the corresponding tenant; and
(iii) upon said predetermined characteristics of an inactivated tenant achieving a second predetermined state, or crossing a second predetermined threshold, re-activating the tenant,
wherein the inactivating includes reducing a reserved heap memory quota of the corresponding tenant to create released memory, and transferring the released memory elsewhere.

2. The method as claimed in claim 1 wherein said predetermined characteristics include a characteristic selected from the class consisting of:
reading from, or writing to, TCP or UDP sockets,
reading from, or writing to, files,
time spent accessing a CPU, and
time spent with a predetermined thread activated.

3. The method as claimed in claim 2 wherein the volume of data read or written is selectable.

4. The method as claimed in claim 2 wherein the duration of the time spent is selectable.

5. The method as claimed in claim 1 wherein a tenant being inactivated involves a step selected from the class of steps consisting of:
suspending operation of one or more threads or processes of the corresponding tenant,
performing a garbage collection on a heap memory of the corresponding tenant, and
transferring control of monitored characteristic actions from the corresponding tenant.

6. The method as claimed in claim 5 wherein said reserved heap memory released by said garbage collection is transferred to a free pool of heap memory.

7. The method as claimed in claim 5 wherein said reserved heap memory released by said garbage collection is transferred to one or more active tenants.

8. The method as claimed in claim 1 wherein a tenant being re-activated involves a step selected from the class of:
resuming the operation of one or more threads or processes of the corresponding tenant,
increasing the reserved heap memory quota of the re-activated tenant, and
re-assigning control of monitored characteristic actions to the re-activated tenant.

9. The method as claimed in claim 8 wherein the increased memory of said increased reserved heap is transferred from a shared pool of unused heap memory.

10. The method as claimed in claim 8 wherein the increased memory of said increased reserved heap is transferred from the reserved heap memory of one or more other tenants.

11. The method as claimed in claim 10 wherein prior to transferring memory from said one or more other tenants, a garbage collection action is performed on said one or more other tenants.

12. A system for saving computer resources in a multi-tenanted computer environment in which a plurality of tenants operate within a single JAVA virtual machine, or equivalent, said system comprising:
a monitoring facility to monitor predetermined characteristics of the operation of each tenant;
a passivating facility connected to said monitoring facility and operable to inactivate a tenant upon said monitored predetermined characteristics achieving a first predetermined state, or crossing a first predetermined threshold; and
an awakening facility connected to said monitoring facility and operable to reactivate said inactivated tenant upon said monitored predetermined characteristics achieving a second predetermined state, or crossing a second predetermined threshold,
wherein the passivating facility is configured to reduce a reserved heap memory quota of said tenant to create released memory, and transferring the released memory elsewhere.

13. The system as claimed in claim 12 wherein said predetermined characteristics include a characteristic selected from the class consisting of:
reading from, or writing to, TCP or UDP sockets,
reading from, or writing to, files,
time spent accessing a CPU, and
time spent with a predetermined thread activated.

14. The system as claimed in claim 13 wherein the volume of data read or written is selectable.

15. The system as claimed in claim 13 wherein the duration of the time spent is selectable.

16. The system as claimed in claim 12 wherein said passivating facility is configured to perform an action selected from the class of actions consisting of:
   suspending the operation of one or more threads or processes of the corresponding tenant,
   performing a garbage collection on the heap memory of the corresponding tenant, and
   transferring control of monitored characteristic actions from said corresponding tenant.

17. The system as claimed in claim 16 wherein said reserved heap memory released by said garbage collection is transferred to a free pool of heap memory.

18. The system as claimed in claim 16 wherein said reserved heap memory released by said garbage collection is transferred to one or more active tenants.

19. The system as claimed in claim 12 wherein said reawakening actuator involves an action selected from the class of:
   resuming the operation of one or more threads or processes of the corresponding tenant,
   increasing the reserved heap memory quota of the re-activated tenant, and
   re-assigning control of monitored characteristic actions to the re-activated tenant.

20. The system as claimed in claim 19 wherein the increased memory of said increased reserved heap is transferred from a shared pool of unused heap memory.

21. The system as claimed in claim 18 wherein the increased memory of said increased reserved heap is transferred from the reserved heap memory of one or more other tenants.

22. The system as claimed in claim 21 wherein prior to transferring memory from said one or more other tenants, a garbage collection action is performed on said one or more other tenants.

* * * * *